Dec. 25, 1934.                W. E. WOLFE                1,985,806
                                RAIL BOND
                            Filed Oct. 10, 1932

Inventor
W. E. Wolfe
By
Philip E. Siggers
Attorney

Patented Dec. 25, 1934

1,985,806

UNITED STATES PATENT OFFICE 1,985,806

RAIL BOND

William E. Wolfe, Dante, Va.

Application October 10, 1932, Serial No. 637,132

1 Claim. (Cl. 173—280)

This invention relates to rail bonds and, among other objects, aims to provide an improved rail bond which is quickly and easily attached, which may be detached at any time without any difficulty whatever and used over again, which insures an excellent electrical contact at all times, and which employs a terminal of such simple construction that it may be made in large quantities by automatic machinery. The invention is particularly useful in electrically operated mines and quarries whose tracks must be taken up and relocated from time to time, as it makes possible reuse of the rail bonds without any loss whatever.

In the accompanying drawing forming a part of this specification,

Referring particularly to the drawings, there is shown a pair of rails 5, which may be considered as mine car rails or standard railway rails, brought together to form a joint 6, which must be bridged by a rail bond to make a good electrical connection between the rails. The rail bond comprises a copper cable 7, of standard construction, both ends of which are permanently connected as by brazing to connectors 8 which are removably secured to the webs of rails 5.

Figure 1:
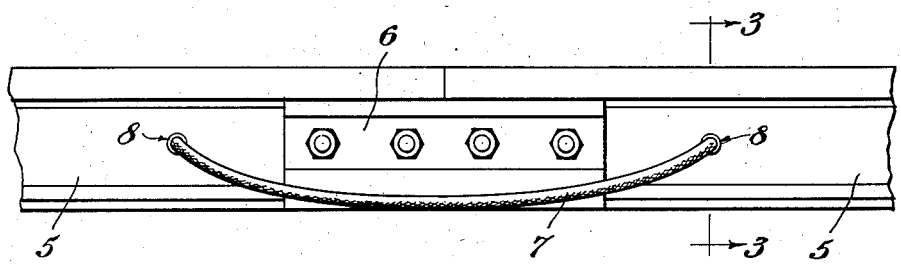
Fig. 1 is a side elevation of a conventional rail joint showing the improved rail bond.
Figure 2:
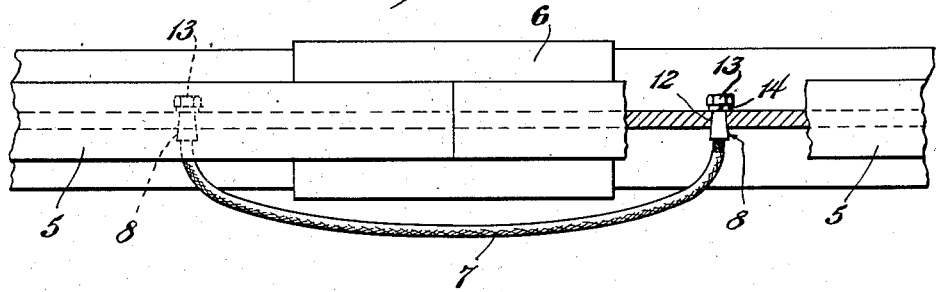
Fig. 2 is a top plan of the same, part of the rail being in section.
Figure 3:
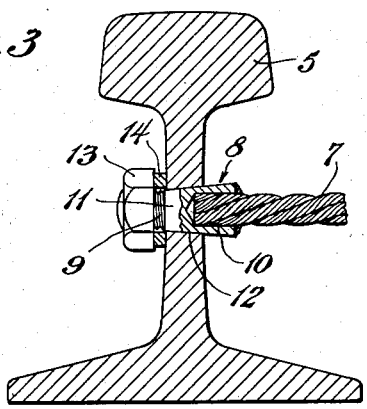
Fig. 3 is an enlarged section on line 3—3 of Fig. 1.
Figure 4:
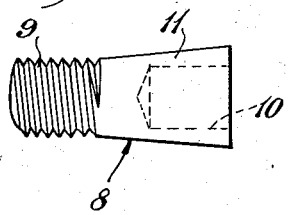
Fig. 4 is an enlarged elevation of the connector.

The connectors 8, which preferably are of brass or bronze, have screw-threaded ends 9 and sockets 10 at the opposite ends, said sockets being barely wide enough to receive the bare ends of cable 7, as shown in Fig. 3, so that a strong and permanent union is secured between these parts. Preferably, the complete rail bond, comprising a length of cable 7 with two connectors 8, one on each end, is assembled at the factory, so that no brazing or similar operation is necessary in the field of operations. Each connector has a tapered shank 11, the taper being toward the screw-threaded end 9. When it is desired to connect the bond to the rails, the latter are bored and shaped with a reamer (or, if previously bored, are cleaned out with a reamer to remove rust, etc.) so that a perfect fit and perfect contact is had between the tapered shank 11 and the hole 12 in the rail. The size of hole 12 is such as to prevent the shank 11 from passing through and preferably is such that the screw threads 9 are completely exposed on one side of the rail, as shown in Fig. 3, while practically no portion of shank 11 is so exposed. To secure the connectors to the rails, a nut 13 and lock washer 14 is employed on each screw-threaded end 9, said nut working against the taper of shank 11 to tighten said shank in the reamed hole.

It will be clear that when the nut is drawn up very tightly, the walls of the hollow shank 11 will be slightly deformed, due to the wedging action of the tapered hole 12, thus gripping the end of cable 7 more firmly and making a better electrical contact between the cable and connector as well as between the connector and the rail. The connection is so tight that moisture is completely excluded. When it is desired to take up the rails, the bond is detached by merely turning two nuts and may be used again in its entirety because no damage is done to the rail, the connector or the cable during disconnection.

Obviously, the present invention is not restricted to the particular embodiment thereof herein shown and described.

What I claim is:—

In combination with a pair of rails each having a tapered bore in the web near one end, a rail bond comprising a conductor and a connector secured to each end of the conductor; each connector having a screw-threaded end; a nut on said screw-threaded end and adapted to bear against the rail web when tightened; each connector having a shank which tapers toward said screw-threaded end; each tapered shank having a socket whose diameter nearly equals the diameter of the tapered shank at its narrowest point so as to provide a relatively thin wall; said socket being of such length that part of it is within the confines of the said web when the connector is in position; said conductor having both ends in the sockets and being gripped by the flexing of said relatively thin walls under the wedging action of the tapered bore, when said nut is drawn up tightly.

WILLIAM E. WOLFE.